UNITED STATES PATENT OFFICE.

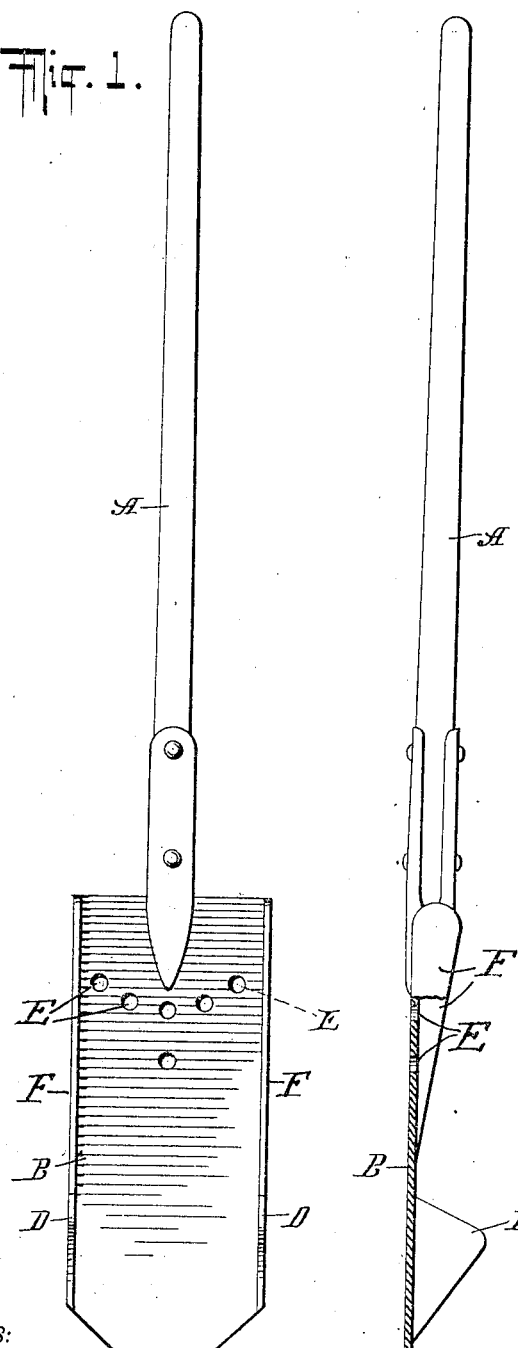

EDWIN M. SKINNER, OF NEW YORK, N. Y.

SPADE.

No. 926,146.

Specification of Letters Patent.

Patented June 29, 1909.

Application filed May 9, 1908. Serial No. 431,779.

*To all whom it may concern:*

Be it known that I, EDWIN M. SKINNER, a citizen of the United States, and resident of Fort Wadsworth, Staten Island, borough and county of Richmond, city and State of New York, have invented certain new and useful Improvements in Spades, of which the following is a specification.

My invention relates to spades and has for its object to provide a spade which is especially adapted for use in digging trenches in meadows or marshlands. It has been very difficult in diggings of this kind to remove the sod from the trenches owing to the fact that as the shovel or spade is manipulated to remove the sod from the trench a vacuum is formed, which prevents the ready removal of the sod.

The particular object of my invention is to overcome this difficulty.

My device will be fully described hereinafter and the features of novelty will be pointed out in the appended claim.

Reference is to be had to the accompanying drawings, in which—

Figure 1 is a face view of my improved spade and Fig. 2 is a side view thereof partly in section.

The spade comprises a handle A which is attached to the blade B in any suitable manner. The blade B, if desired, may be provided with a pointed cutting end C and may further be provided with side cutting members D. The cutting edges of these members D preferably extend downwardly at an angle and the upper edges thereof upwardly so as to minimize the danger of the said members D being bent when the spade is used. The said spade may further be provided with side flanges F which extend from the upper portion of the blade to a point above each cutting member D. I have shown and described a spade of this particular description in my application for a patent filed in the United States Patent office on or about January 30th, 1908, Ser. No. 413,400. Openings or perforations E are provided in the upper portion of the blade B so as to permit the ingress of air to the space behind the blade which is formed as the spade is moved by the workman to remove the sod, so that it is impossible for a vacuum to form to retard the removal of the sod.

It is to be understood that the vacuum above mentioned is formed as the spade is swung to remove the sod and unless it is destroyed it is impossible to lift the sod from the trench. By providing the blade of the spade with openings as in the present case, air rushes through as the spade is manipulated and it is impossible for a vacuum to form. All resistance is thus automatically overcome and it is very easy to remove the sod from the trench with my tool.

I claim:

A digging tool comprising a blade having apertures therein, cutting members formed thereon and projecting outwardly therefrom, the cutting edges of said members extending downwardly at an angle and the upper edges being inclined upwardly at an angle, and side flanges extending along the sides of said blade from the upper portion thereof to a point above the cutting members.

In witness whereof I have hereunto set my hand in the presence of two subscribing witnesses this 6th day of May 1908.

EDWIN M. SKINNER.

Witnesses:
JOHN A. KEHLENBECK,
JOHN LOTKA.